May 3, 1938.　　　J. A. NASMAN　　　2,116,361
ANIMAL FEEDER
Filed March 23, 1936　　　2 Sheets-Sheet 1
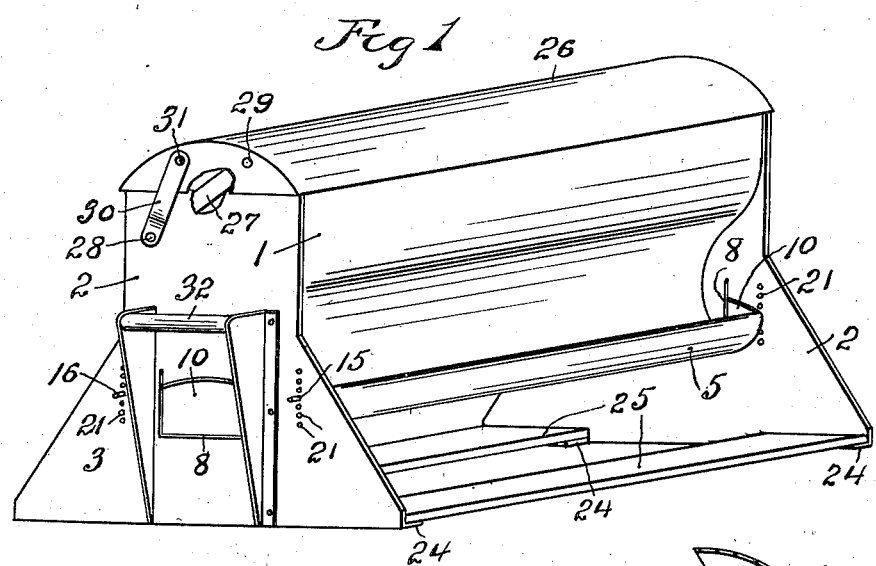
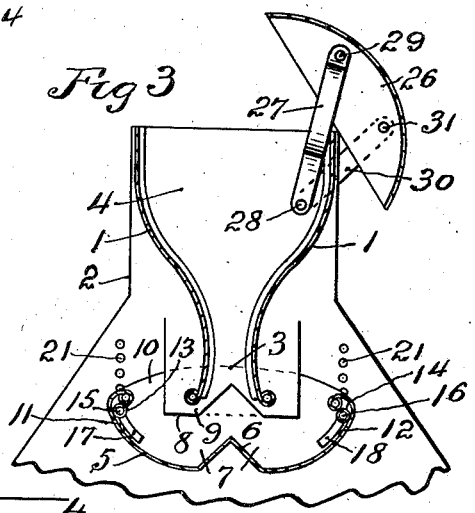
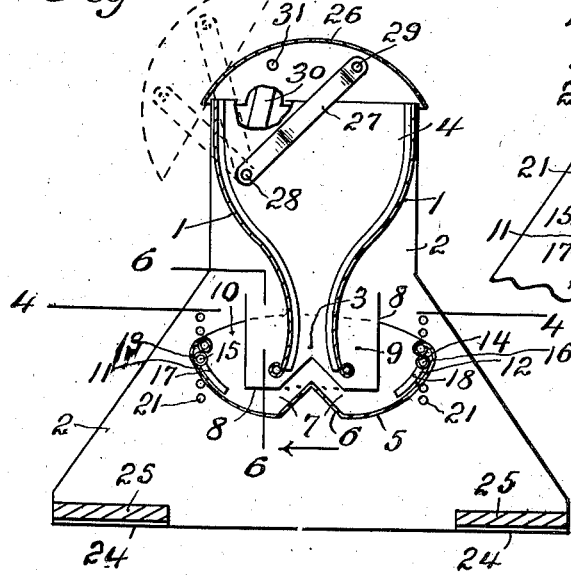
INVENTOR.
John A. Nasman
BY Warren D. House
His ATTORNEY

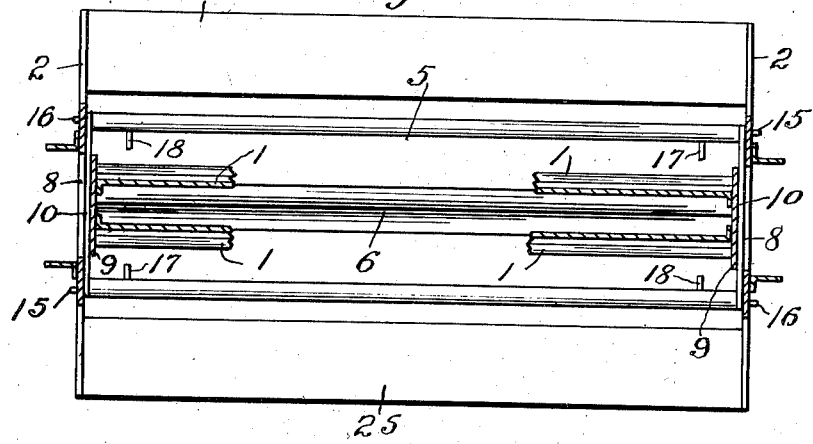
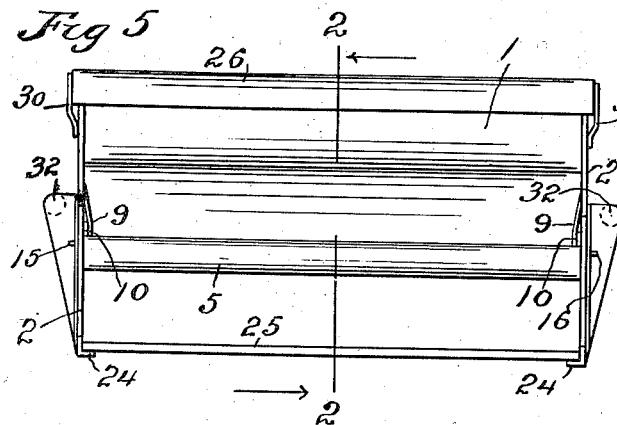
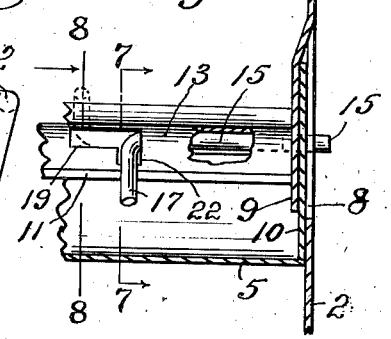
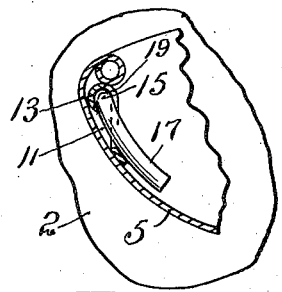
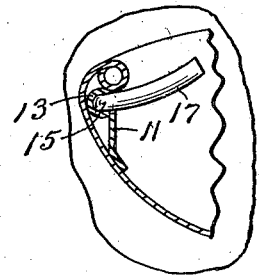
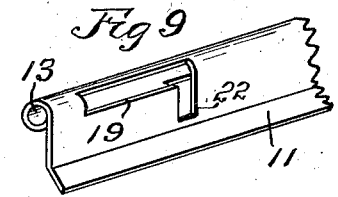
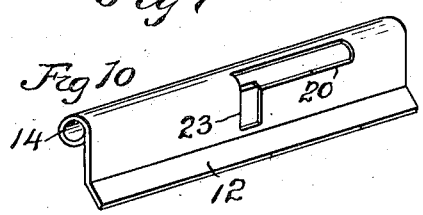

Patented May 3, 1938

2,116,361

UNITED STATES PATENT OFFICE 2,116,361

ANIMAL FEEDER

John A. Nasman, Horton, Kans.

Application March 23, 1936, Serial No. 70,454

2 Claims. (Cl. 119—53)

My invention relates to improvements in animal feeders.

While my improved feeder may be employed for use in feeding different kinds of animals, it is particularly well adapted for feeding poultry.

My improved animal feeder is of the type having a feed containing hopper having a discharge opening through which the feed material discharges by gravity downwardly into a feed trough, the food therein being accessible by animals at opposite sides of the trough.

One of the objects of my invention is the provision of a feed trough that is vertically adjustable to positions in which the trough will be disposed at different elevations to accommodate it to animals of different statures, and in positions in which the bottom of the trough will be at different distances from the discharge opening of the hopper.

Another object of my invention is the provision of novel means for supporting the feed trough in the different positions to which it may be adjusted.

My invention provides further novel means for releasably locking the trough supporting means in the supporting positions.

A further object of my invention is the provision of a hopper of novel construction.

Still another object of my invention is the provision of novel means for attaching a cover to the body of the hopper.

Another object of my invention is the provision of an animal feeder of the kind described which is simple, cheap, strong, durable, not likely to get out of order, which may be readily transported, which is sanitary and adapted for feeding different kinds of food material, and which is efficient in its operation.

The novel features of my invention are hereinafter fully described and claimed.

In the accompanying drawings, which illustrate the preferred embodiment of my invention, Fig. 1 is a perspective view of my improved animal feeder, parts being broken away.

Fig. 2 is a cross section on the line 2—2 of Fig. 5 looking in the direction indicated by the lower arrow, the cover being shown in solid lines in the closed position, and in dotted lines in the open position.

Fig. 3 is a sectional view on the plane of the line 2—2 of Fig. 5 looking in the direction indicated by the upper arrow, the cover being shown in the open position, and the feed trough being shown in a position lower than that in Fig. 2.

Fig. 4 is a section on the line 4—4 of Fig. 2.

Fig. 5 is a reduced side elevation of the feeder shown with the cover closed.

Fig. 6 is an enlarged section on the right angled line 6—6 of Fig. 2.

Fig. 7 is an enlarged section on the line 7—7 of Fig. 6.

Fig. 8 is an enlarged section on the plane of the line 8—8 of Fig. 6, showing the locking member, in dotted lines in Fig. 6, in the unlocked and released position.

Fig. 9 is an enlarged perspective view of one of the guides, in which the locking members operate, partly broken away.

Fig. 10 is a perspective view of another one of the locking member guides.

Similar characters of reference designate similar parts in the different views.

The body of the hopper is provided with side walls 1 to opposite ends of which are respectively fastened end walls 2, said side and end walls being, preferably, of sheet steel.

The side walls 1 converge downwardly for a substantial distance and then diverge outwardly to their lower edges, as shown in Figs. 2 and 3, thus providing a flaring discharge opening, 3, which reduces liability of the food material clogging the opening.

The lower portions of the end walls 2 are much wider than the contracted lower portion of the hopper chamber 4, the latter being the space enclosed by the side walls and the portions of the end walls which connect the side walls.

Extending between the end walls 2 with its bottom under and spaced from the opening 3 is a feed trough 5, which bottom has a longitudinal angular upwardly converging middle portion 6, disposed below the opening 3, with its apex or ridge in a longitudinal vertical plane disposed midway between the side walls 1. This middle portion 6 forms with the diverging lower portions of the side walls 1 two passages 7 which lead downwardly and oppositely laterally from the opening 3, so as to discharge feed into the trough 5 at opposite sides of the hopper discharge portion.

The feed trough 5 is much wider than the width of the lower feeding portion of the hopper, and is adapted for removal and for vertical adjustment in which its bottom will be at different distances from the opening 3.

Each end wall 2 is provided with a slit the transverse portion 8 of which extends transversely below the lower edges of the side walls 1. Said slit is U-shaped, the arms of the slit extending upwardly from the ends of the transverse portion 8 and at opposite sides respectively of the lower part of the feeding portion of the hopper. Each U-shaped slit forms a depending tongue 9 which is attached to the adjacent ends of the side walls 1, Figs. 2 and 3.

In mounting the feed trough in its operative position, the ends 10 of the trough are respectively slipped upwardly at the outer sides of the tongues 9 and the inner sides of the adjacent portions of the end walls 2, as shown in Figs. 1, 2, 3, 4 and 6.

This construction permits the discharge opening 3 to be the full length of the side walls 1 and yet be all disposed between the end walls 10 of the feed trough.

For releasably supporting the trough 5 in different operative positions there are provided four locking members and four guides respectively therefor. These guides are fastened to the bottom of the feed trough 5 on the inner side thereof, and comprise two plates 11 and two plates 12, respectively provided with longitudinal tubular portions 13 and 14 which form guides in which two locking members 15 and 16 are respectively slidable and axially revoluble. See Figs. 2, 3 and 6 to 10.

The locking members 15 and 16 are respectively provided with lateral arms 17 and 18 which respectively extend through longitudinal slots 19 and 20 in the tubular portions 13 and 14 respectively.

Each end of the trough is provided with holes therethrough respectively registering with the cylindrical opening of the tubular portions 13 and 14, so that the locking members 15 and 16 in said tubular portions may be slid so as to project outside the adjacent end 10 of the trough 5.

Each end wall 2 is provided at opposite sides of the side walls 1 respectively with two vertical rows of holes 21. The holes of each of said rows are disposed so as to receive the adjacent locking member 15 or 16 as the case may be, as shown in Figs 1 to 6, for supporting the trough in the position to which it may be adjusted.

The lower side of each slot 19, nearest to the adjacent end wall 2 is provided with an offset 22 adapted to receive the arm 17 of the locking member 15, for holding the locking member from accidental withdrawal from the hole 21 in which at the time the locking member is disposed.

In like manner each slot 20 is provided at its lower side at its end nearest the adjacent end wall 2 with an offset 23 adapted to receive the arm 18 of the adjacent locking member 16, for holding said locking member from accidental retraction from the hole 21 in which, at the time, it is disposed.

To change the elevation of the trough 5 relative to the opening 3, the locking members 15 and 16 are swung upwardly out of the offsets 22 and 23 respectively and then slid inwardly out of engagement with the adjacent end walls 2. The trough 5 is then raised or lowered, as desired to the position that it is to occupy, after which the locking members 15 and 16 are slid outwardly into the adjacent holes 21 respectively, and then turned axially until their arms 17 and 18 respectively enter the offsets 22 and 23 adjacent thereto.

The vertical adjustment of the feed trough may be effected for either of two purposes, that of adapting the height of the trough to the stature of the animals to be fed, or of increasing or decreasing the capacity of the discharge passages 7 to suit the particular food material that is to be fed. With material that flows freely, the trough may be elevated to reduce the discharge capacity, or vice versa.

The end walls 2 are each provided at its lower edge, respectively adjacent to its side edges with inwardly turned flanges 24 upon which respectively rest adjacent ends of two boards 25 upon which fowls or other animals may stand when feeding from the trough 5.

For closing the open top of the feed chamber 4 of the hopper, there is provided a cover 26 which is adapted to extend over the upper edges of the side walls 1 and end walls 2.

Two hinge members 27 are disposed within the chamber 4 and the cover 26 and are respectively pivoted adjacent to their lower ends by pins 28 to the end walls 2. The pins 28 are alined with each other and respectively extend transversely through the end walls 2 adjacent to one of the side walls 1.

The other ends of the hinge members 27 are respectively fastened by alined pins 29 to the inner ends of the cover 26.

Two hinge members 30 are respectively pivoted to the end walls 2 at the outer sides thereof by the pins 28 which pivotally fasten the hinge members 27 to said end walls. The other ends of the hinge members 30 are pivoted by alined pins 31 to the outer sides respectively of the ends of the cover 26.

The hinge members 30 are shorter than the hinge members 27, extend at an acute angle thereto, and are nearer to the vertical plane of the pins 28 when the cover is closed, as shown in solid lines in Fig. 2.

The hinge members 27 and 30 are of such lengths respectively, and the pins 28, 29 and 31 are so disposed that the cover 26 may be swung from the closed position, shown in solid lines in Fig. 2, to the open position, shown in Fig. 3 and in dotted lines in Fig. 2, in which open position, the hinge members 27 will rest against the adjacent side wall 1, and the center of gravity of the cover will be at the outer side of the vertical plane of the axes of the hinge members 27, the pins 28, which disposition of the cover will hold it from accidentally closing.

Fastened to the outer sides respectively of the end walls 2 are two handles 32, Figs. 1 and 5, by which the feeder may be lifted and transported.

Many modifications of my invention within the scope of the appended claims, may be made without departing from the spirit of my invention.

What I claim is:

1. In an animal feeder, a hopper having side and end walls and a bottom discharge opening, each end wall having a slit extending transversely below said opening and therefrom vertically at opposite sides of said side walls thereby forming a depending tongue, a feed trough having its ends respectively removably slidably insertible between said tongues and the inner sides of the adjacent end walls of the hopper to a position in which the bottom of said trough will be under and spaced from said opening, and means for releasably supporting said trough in said position.

2. In an animal feeder, a hopper having side and end walls and a bottom discharge opening, each end wall having a slit extending transversely below said opening and therefrom upwardly at opposite sides of said side walls thereby forming a depending tongue, a feed trough having its ends respectively removably slidably insertible between said tongues and the inner sides of said end walls and vertically adjustable to positions in which the bottom of said trough will be at different distances from said opening, and means for releasably supporting said trough in each of said positions.

JOHN A. NASMAN.